Jan. 18, 1927.
J. H. PECK
1,614,896
ANIMAL TRAP
Filed May 11, 1926
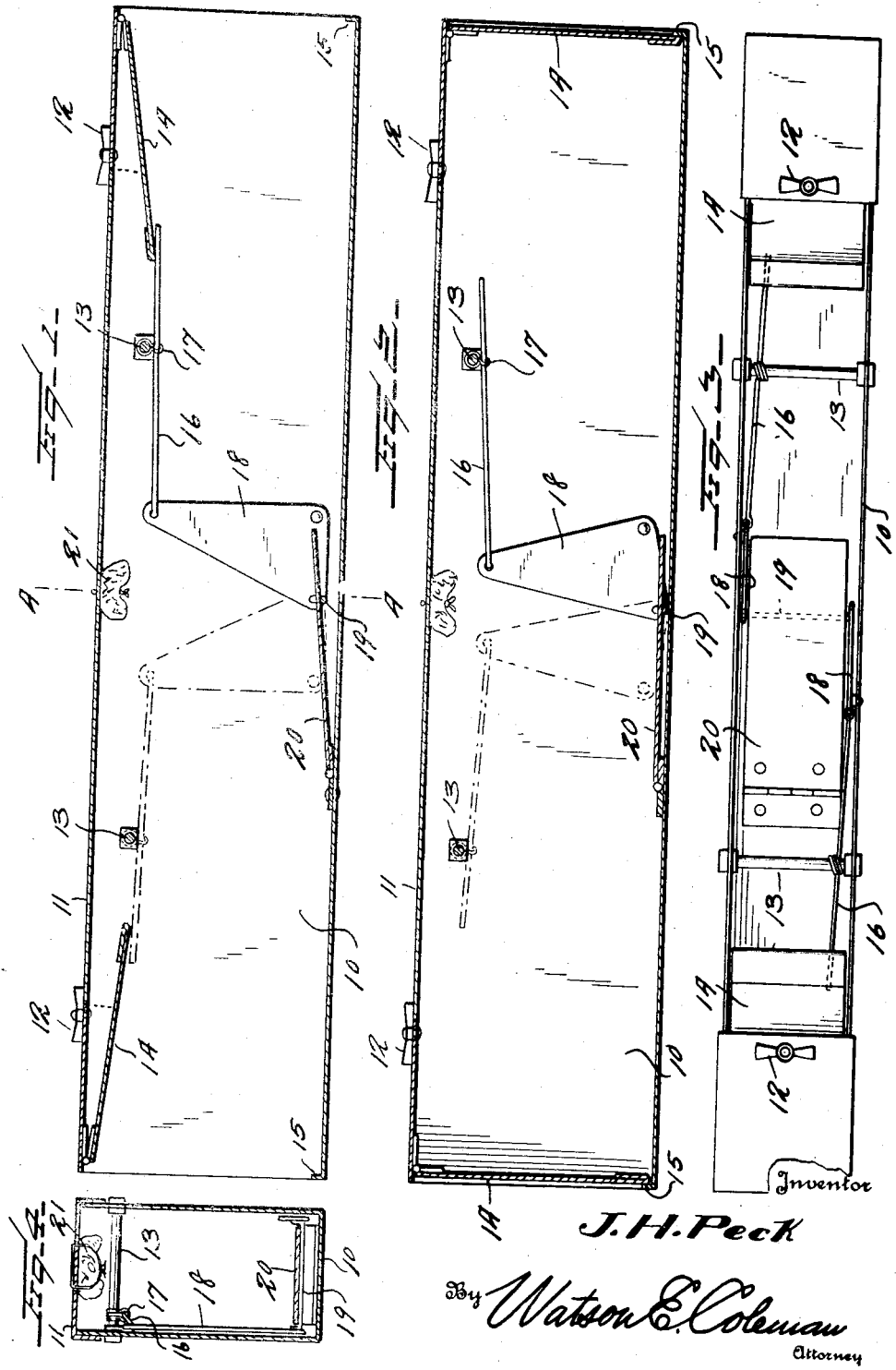
Inventor
J. H. Peck
By Watson E. Coleman
Attorney Patented Jan. 18, 1927.

1,614,896

UNITED STATES PATENT OFFICE.

JOE H. PECK, OF LISCO, NEBRASKA.

ANIMAL TRAP.

Application filed May 11, 1926. Serial No. 108,310.

This invention relates to traps and the general object of the invention is to provide a very simple and effective trap which is particularly adapted for trapping animals whose fur is valuable and where the pelt should not be damaged in the trap.

Another object is to provide a trap which is relatively humane and which has no springs or like parts.

A further object is to provide a trap of this character which may be readily concealed for the reason that the working parts are all disposed interiorly of the trap and thus the trap may be covered over with brush, leaves or earth without in any way interfering with the operation of the working parts.

My invention is illustrated in the accompanying drawings wherein:—

Figure 1 is a longitudinal sectional view of my improved trap with the doors open;

Fig. 2 is a like view to Figure 1 but showing the doors closed and the trap sprung;

Fig. 3 is a top plan view of the trap;

Fig. 4 is a section on the line 4—4 of Figure 1.

Referring to these drawings it will be seen that the body of the trap consists of an elongated casing designated 10, which is open at its opposite ends and which is illustrated as having a cover 11 held in place by latches 12 of any suitable character. The side walls of the trap are held in proper spaced relation to each other and against distortion by transverse bolts 13.

Hinged to the ends of the body 10 are the doors 14. These doors are hinged at their upper ends and normally swing downward by gravity into their closed position and against a flange 15 or equivalent stop, this flange being conveniently formed by turning up the bottom of the trap to a slight degree.

For the purpose of normally holding the doors 14 in a raised position to permit the entrance of animals into the trap, I provide oppositely disposed latches 16 which are longitudinally shiftable and are supported for this longitudinal movement in eyes or loops 17 attached to the bolts 13. The inner end of each of these latches is connected to the upper end of a lever 18, illustrated as having the form of a bell crank lever. These levers are disposed with their lower inner corners opposite each other and these lower inner corners are connected by means of a flexible connection 19. Hingedly mounted or otherwise supported upon the floor of the casing 10 is a platform 20, whose free end rests upon this connection 19 and is held raised thereby. Disposed immediately above the platform is a bait holder 21 of any suitable character.

It will be seen that the trap is set by lifting the doors 14 and projecting the latches 16 beneath the free ends of the respective doors. This will act to elevate the trip platform 20. An animal entering the trap will naturally step upon the platform 20 in order to reach the bait 21 and the weight of the animal will cause the free end of the platform to be depressed, thus depressing the free ends of the bell crank levers 18 and causing the retraction of the latches from beneath the doors 14. The doors will then swing downward and as the doors are prevented from swinging outward by reason of the flanges 15, the animal cannot escape from the trap.

It will be noted that this trap has no springs of any kind and that all of the working parts of the trap are on the inside. This is particularly important as the trap can be set and then covered over with brush, leaves or earth without in any way affecting the operating mechanism. This trap may be disposed between two short sections of hollow logs forming entrances to the opposite ends of the trap and then the trap may be covered with leaves, bark or brush, thus giving the trap the appearance of being the middle portion of a hollow log open at both ends. All animals dislike to enter a trap which is closed at one end but in my form of trap the opposite ends of the trap are open so that the animal can see straight through the trap and, therefore, will enter the trap more readily than otherwise. Obviously, the trap may be made of any suitable material and obviously the form of the trap and the details of construction may be varied in many ways without departing from the spirit of the invention as defined in the appended claim.

I claim:—

A trap of the character described comprising an elongated body open at its opposite ends and having side walls, bolts connecting said walls and holding them in spaced relation to each other, doors hinged to the top of the body at opposite ends thereof and gravitating to a vertical position, stops preventing an outward movement of the doors, bell crank levers mounted upon the body interiorly thereof and having longitudinally extending latches connected at their upper ends and extending in opposite directions parallel to the walls of the trap and normally extending beneath the free ends of the doors, a platform hinged at one end to the floor of the trap, a connection between said bell crank levers extending beneath said platform and supporting it in a raised position, and guides for the latches mounted upon said bolts.

In testimony whereof I hereunto affix my signature.

JOE H. PECK.